United States Patent [19]

Ikenaga et al.

[11] Patent Number: 4,777,204
[45] Date of Patent: Oct. 11, 1988

[54] GEAR COMPRISING FIBER-REINFORCED ANISOTROPIC MELT-FORMING POLYMER FORMED VIA INJECTION MOLDING UNDER SPECIFIED CONDITIONS

[75] Inventors: Yukio Ikenaga; Katsuhiko Takahashi, both of Fuji; Kenji Hijikata, Mishima; Toshio Kanoe, Fuji; Tsuneyoshi Okada, Kawasaki, all of Japan

[73] Assignee: Polyplastics Co., Ltd., Osaka, Japan

[21] Appl. No.: 64,529

[22] Filed: Jun. 22, 1987

Related U.S. Application Data

[62] Division of Ser. No. 869,512, Jun. 2, 1986, abandoned.

[30] Foreign Application Priority Data

Jun. 12, 1985 [JP] Japan ................ 60-127315

[51] Int. Cl.⁴ .......... C08K 7/02; C08K 7/14; C08K 9/04; C08L 67/00

[52] U.S. Cl. .................. 524/439; 264/331.11; 264/331.13; 264/331.15; 264/331.16; 264/331.17; 264/331.18; 264/331.19; 264/331.21; 523/216; 523/444; 523/468; 524/505; 524/537; 524/538; 524/539; 524/555; 524/556; 524/557; 524/563; 524/567; 524/568; 524/571; 524/579; 524/582; 524/585; 524/588; 524/589; 524/571; 524/579; 524/582; 524/585; 524/588; 524/589; 524/601; 524/602; 524/609; 524/606; 524/611; 525/419

[58] Field of Search ............... 523/200, 216; 524/537, 524/538, 539, 555–571, 579–589, 601–611; 264/331.11, 331.13, 331.14, 331.16, 331.19, 331.21; 525/419

[56] References Cited

U.S. PATENT DOCUMENTS 4,458,039 7/1984 Eikman .................. 523/216

Primary Examiner—Allan M. Lieberman
Attorney, Agent, or Firm—Burns, Doane, Swecker & Mathis

[57] ABSTRACT

A resin composition is suitable for molding to a gear and comprises 30 to 98 percent by weight of a resin being capable of the anisotropic phase in the molten state and the melt processing and 2 to 70 percent by weight of fibers such as metal fibers, carbon fibers, glass fibers, inorganic fibers, synthetic fibers and mineral fibers.

19 Claims, 1 Drawing Sheet

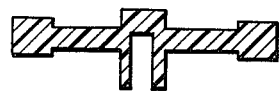
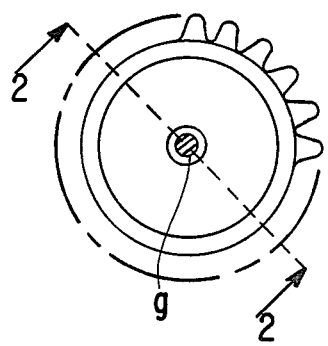
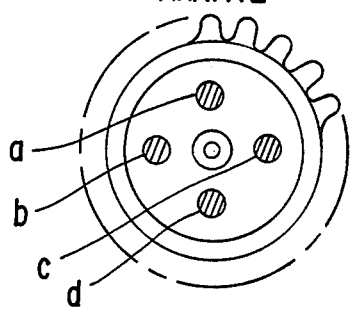

GEAR COMPRISING FIBER-REINFORCED ANISOTROPIC MELT-FORMING POLYMER FORMED VIA INJECTION MOLDING UNDER SPECIFIED CONDITIONS

This application is a division of application Ser. No. 869,512, filed June 2, 1986 and now abandoned.

The present invention relates to resin compositions for gears. More particularly, it pertains to resin compositions for gears excellent in terms of mass production, accuracy and mechanical strengths, containing resins called thermotropic liquid crystal polymers which show anisotropy when molten.

STATEMENT OF PRIOR ARTS

Gears made of resins, as compared with gears made of metals, being light in weight and excellent in self-lubrication, corrosion resistance, noise suppression, workability, mass productivity, etc., are finding applications in various industries. However, these resins have their own drawbacks which include low heat resistance, large thermal deformation and large shrinkage in working, etc., and for this reason, their miniaturization and uses in high temperature atmosphere are limited. In answer to the social demands of resin gears for miniaturization, strengthening and widening of usable temperature range, responsive arrangements for thermosetting resins, mixing of fibers, raising of melting points of thermoplastic resins and other improvements have been attempted.

However, the thermosetting resins are not adaptable for mass production and show low workability. The mixing of fibers and raising of melting points respectively provide recognizable effects in increase in mechanical strengths and improvement in heat resistance, but at the cost of lowered workability and mass productivity because of marked increase in viscosity at the time of melting.

Attempts have been being made assiduously for strengthening, miniaturization and expansion of usable temperature range without losing these resins' advantageous features, but are still insufficient.

SUMMARY OF THE INVENTION

The present inventors, in an effort to solve such problems, engaged in studies and found out the fact that if the basic resins are ones called thermotropic liquid crystal polymers which exhibit anisotropy when molten, remarkable reduction in viscosity while they are molten is realizable and an increase in strength by way of mixing of fibers is achievable without lowering workability and mass productivity, which finding has led to completion of this invention.

A resin composition is suitable for moulding to a gear and comprises 30 to 98 percent by weight of a resin being capable of the anisotropic phase in the molten state and the melt processing and 2 to 70 percent by weight of fibers.

Thus, the present invention relates to resin compositions containing 30~98% by weight of fusible resins which form anisotropic melt phase and 2–70% by weight of fibers, which compositions may contain, as desired, lubricants and antistatic agents.

The present invention provides resin compositions which not only have enabled miniaturization and strengthening which were hitherto, hardly attainable in resin gears but their use under exposure to high temperatures and chemical substances.

The resins used according to this invention which realize marked reduction in viscosity, when molten, are polymer compositions which show optical anisotropy, while being molten, and which are thermoplastic and workable by fusion, such compositions being generally classified as thermotropic liquid crystal polymers.

Such polymers which form anisotropic melt phase have a property that under their molten state, the polymer molecule chains are regularly aligned in parallel arrangement. The state in which molecules are arranged in this way is often called liquid crystal state or nematic phase of liquid crystalline material. Such polymers are manufactured from monomers which are generally slender, and flat, which have appreciably high rigidity along the long axis of molecule and which have a plurality of chain-extending bonds which are normally in coaxial or parallel relation to each other.

The property of the anisotropic fused phase may be confirmed by the accustomed polarization inspection method based on use of crossed polarizers. More particularly, confirmation of the anisotropic fused phase may be made by observation of the sample mounted on the Leitz hot stage in a nitrogen atmosphere at a magnification of 40 powers, using a polarizing microscope. The aforementioned polymers are optically anisotropic. That is, they permit transmission of a light beam, when put between crossed polarizers. If the sample is optically anisotropic, the polarized light will be transmitted, even when it is in stationary state.

Components of the polymers which form the anisotropic fused phase as abovementioned include:

1 One or more of aromatic dicarboxylic acids and alicyclic dicarboxylic acids;

2 One or more of aromatic diols, alicyclic diols and aliphatic diols;

3 One or more of aromatic hydroxycarboxylic acids;

4 One or more of aromatic thiol-carboxylic acids;

5 One or more of aromatic dithiols and aromatic thiol phenols; and

6 One or more of hydroxylamines and aromatic diamines.

And the polymers which form the anisotropic fused phase are composed of combinations such as:

(I) Polyesters formed of 1 and 2 ;
(II) Polyesters formed of 3 only;
(III) Polyesters formed of 1 , 2 and 3 ;
(IV) Polythiol esters formed of 4 only;
(V) Polythiol esters formed of 1 and 5 ;
(VI) Polythiol esters formed of 1 , 4 and 5 ;
(VII) Polyester amides formed of 1 , 3 and 6 ; and
(VIII) Polyester amides formed of 1 , 2 , 3 and 6 , etc.

Although not included in the category of combinations of components hereabove mentioned, organic polyazomethines are included in polymers which form the anisotropic fused phase. Particular examples mentioned as such polymers are poly(nitrilo-2-methyl-1,4-phenylenenitriloethylidyne-1,4-phenyleneethyidyne), poly(nitrilo-2-methyl-1,4-phenylenenitrilomethylidyne-1,4-phenylenemethylidyne), and poly(nitrilo-2-chloro-1,4-phenylenenitrilomethylidyne-1,4-phenylenemethylidyne).

Further, polymers which are not included in the category of combinations of components abovementioned, but form the anisotropic fused phase, include polyester carbonates. They substantially comprise 4-oxybenzoyl units, dioxyphenyl units, dioxycarbonyl units and terephthaloyl units.

In the following, compounds which provide components of the aforementioned combinations (I)~(VIII) are listed:

Mentioned as aromatic dicarboxylic acids are: aromatic dicarboxylic acids such as terephthalic acid, 4,4'-diphenyldicarboxylic acid, 4,4'-triphenyldicarboxylic acid, 2,6-naphthalenedicarboxylic acid, diphenylether-4,4'-dicarboxylic acid, diphenoxyethane-4,4'-dicarboxylic acid, diphenoxybutane-4,4'-dicarboxylic acid, diphenylethane-4,4'-dicarboxylic acid, isophthalic acid, diphenyl ether-3,3'-dicarboxylic acid, diphenoxyethane-3,3'-dicarboxylic acid, diphenylethane-3,3'-dicarboxylic acid and naphthalene-1,6-dicarboxylic acid, and derivatives of the aforementioned aromatic dicarboxylic acids substituted with alkyls, alkoxyls or halogens such as chloroterephthalic acid, dichloroterephthalic acid, bromoterephthalic acid, methylterephthalic acid, dimethylterephthalic acid, ethylterephthalic acid, methoxyterephthalic acid and ethoxyterephthalic acid.

Mentioned as alicyclic dicarboxylic acids are: alicyclic dicarboxylic acids such as trans-1,4-cyclohexanedicarboxylic acid, cis-1,4-cyclohexanedicarboxylic acid, 1,3-cyclohexanedicarboxylic acid, etc., and derivatives of the aforementioned alicyclic dicarboxylic acids substituted with alkyls, alkoxyls or halogens such as trans-1,4-(1-methyl)cyclohexanedicarboxylic acid, trans-1,4-(1-chloro)cyclohexanedicarboxylic acid, etc.

Mentioned as aromatic diols are: aromatic diols such as hydroquinone, resorcinol, 4,4'-dihydroxydiphenyl, 4,4'-dihydroxytriphenyl, 2,6-naphthalenediol, 4,4'-dihydroxydiphenyl ether, bis(4-hydroxyphenoxy)ethane, 3,3'-dihydroxydiphenyl, 3,3'-dihydroxydiphenyl ether, 1,6-naphthalenediol, 2,2-bis(4-hydroxyphenyl)propane, 2,2-bis(4-hydroxyphenyl)methane, etc., and alkyl, alkoxyl or halogen derivatives of the aforementioned aromatic diols, such as chlorohydroquinone, methylhydroquinone, 1-butylhydroquinone, phenylhydroquinone, methoxyhydroquinone, phenoxyhydroquinone, 4-chlororesorcinol, 4-methylresorcinol, etc.

Mentioned as alicyclic diols are: alicyclic diols such as trans-1,4-cyclohexanediol, cis-1,4-cyclohexanediol, trans-1,4-cyclohexanedimethanol, cis-1,4-cyclohexanedimethanol, trans-1,3-cyclohexanediol, cis-1,2-cyclohexanediol, trans-1,3-dyclohexanedimethanol, and alkyl, alkoxyl or halogen derivatives of the aforementioned alicyclic diols such as trans-1,4-(1-methyl)-cyclohexanediol and trans-1,4-(1-chloro)cyclohexanediol.

Mentioned as aliphatic diols are: straight-chain or branched aliphatic diols such as ethylene glycol, 1,3-propanediol, 1,4-butanediol, neopentyl glycol, etc.

Mentioned as aromatic hydroxycarboxylic acids are: aromatic hydroxycarboxylic acids such as 4-hydroxybenzoic acid, 3-hydroxybenzoic acid, 6-hydroxy-2-naphthoic acid and 6-hydroxy-1-naphthoic acid, etc., and alkyl, alkoxyl or halogen derivatives of the aromatic hydroxycarboxylic acids such as 3-methyl-4-hydroxybenzoic acid, 3,5-dimethyl-4-hydroxybenzoic acid, 2,6-dimethyl-4-hydroxybenzoic acid, 3-methoxy-4-hydroxybenzoic acid, 3,5-dimethoxy-4-hydroxybenzoic acid, 6-hydroxy-5-methyl-2-naphthoic acid, 6-hydroxy-5-methoxy-2-naphthoic acid, 3-chloro-4-hydroxybenzoic acid, 2-chloro-4-hydroxybenzoic acid, 2,3-dichloro-4-hydroxybenzoic acid, 3,5-dichloro-4-hydroxybenzoic acid, 2,5-dichloro-4-hydroxybenzoic acid, 3-bromo-4-hydroxybenzoic acid, 6-hydroxy-5-chloro-2-naphthoic acid, 6-hydroxy-7-chloro-2-naphthoic acid and 6-hydroxy-5,7-dichloro-2-naphthoic acid, etc.

Mentioned as aromatic mercaptocarboxylic acids are: 4-mercaptobenzoic acid, 3-mercaptobenzoic acid, 6-mercapto-2-naphthoic acid and 7-mercapto-2-naphthoic acid, etc.

Mentioned as aromatic dithiols are: benzene-1,4-dithiol, benzene-1,3-dithiol, 2,6-naphthalenedithiol and 2,7-naphthalenedithiol, etc.

Mentioned as aromatic mercaptophenols are: 4-mercaptophenol, 3-mercaptophenol, 6-mercaptophenol and 7-mercaptophenol, etc.

Mentioned as aromatic hydroxyamine and aromatic diamine are: 4-aminophenol, N-methyl-4-aminophenol, 1,4-phenylenediamine, N-methyl-1,4-phenylenediamine, N,N'-dimethyl-1,4-phenylenediamine, 3-aminophenol, 3-methyl-4-aminophenol, 2-chloro-4-aminophenol, 4-amino-1-naphthol, 4-amino-4'-hydroxydiphenyl, 4-amino-4'-hydroxydiphenyl ether, 4-amino-4'-hydroxydiphenylmethane, 4-amino-4'-hydroxydiphenyl sulfide, 4,4'-diaminophenyl sulfide(thiodianiline), 4,4'-diaminophenyl sulfone, 2,5-diaminotoluene, 4,4'-ethylenedianiline, 4,4'-diaminodiphenylethane, 4,4'-diaminodiphenylmethane(methylenedianiline) and 4,4'-diaminodiphenyl ether(oxydianiline), etc.

There are polymers, of the aforementioned polymers (I)~(VIII) consisting of respective components abovementioned, which either form the anisotropic fused phase or not, depending on the components, composition ratio in the polymer and the sequence distribution, but the polymers employed according to this invention are restricted to those of the aforementioned polymers which form the anisotropic fused phase.

The polyesters of the aforementioned (I), (II) and (III) and the polyester amides of (VIII) abovementioned being polymers which form the anisotropic fused phase appropriate for use according to this invention may be formed by a wide variety of ester forming processes which permit reactions between organic monomer compounds having functional groups capable of forming the required repetitive units by condensation. Such functional groups of these organic monomer compounds may include carboxyl group, hydroxyl group, ester group, acyloxy group, acid halides, amine group, etc. The aforementioned organic monomer compounds may be subjected to the reaction by way of fusion acidolysis in the absence of heat exchange fluid. According to this method, a fused solution of reaction materials is formed first by heating the monomers together. As the reaction proceeds, solid polymer particles become suspended in the solution. Vacuum may be applied for facility in removal of volatile matters (e.g., acetic acid or water) which have been produced as by-products at the final stage of the condensation.

Besides, the slurry condensation method may be adopted for forming the aromatic polyesters which are preferred according to this invention. By this method, the solid product is obtained in the state of being suspended in heat exchange medium.

Whether the aforementioned fusion acidolysis process or slurry polymerization process is employed, the organic monomer reaction substances from which the perfect aromatic polyesters are derived may be supplied for the reaction in a modified state (i.e., as lower acyl esters) in which the hydroxyl groups of such monomers at the normal temperature are esterified. The lower acyl groups should desirably have approx. 2~4 carbon atoms. Preferably, acetic acid esters of the reaction products from such organic monomers are subjected to the reaction.

Further, mentioned as representative examples of the catalyzer arbitrarily usable either in the fusion acidolysis or slurry process are: dialkyltin oxides (e.g., dibutyltin oxide), diaryltin oxides, titanium dioxide, antimony trioxide, alkoxytitanium silicate, titanium alkoxide, alkali and alkaline earth metal salts of carboxylic acids (e.g., zinc acetate), and such gaseous catalyzers as Lewis acids (e.g., BF₃) and hydrogen halides (e.g., HCl), etc. The amount of the catalyzers used should be in general approx. 0.001~1% by weight, preferably, approx. 0.01~0.2% by weight, based on the total weight of the monomers.

The aromatic polymers suitable for use with the method of this invention show tendency of generally being substantially insoluble in solvents and accordingly, they are unfit for solution processing. However, these polymers may be readily processed by the ordinary fusion method, as already described. Especially preferable aromatic polymers should be soluble in pentafluorophenol to some degree.

The aromatic polyester preferable used according to this invention generally should have weight-average molecular weights of approx. 2,000~200,000, preferably, approx. 10,000~50,000 and especially preferably, approx. 20,000~25,000. On the other hand, the preferred aromatic polyester amide should generally have molecular weights of approx. 5,000~50,000, preferably, approx. 10,000~30,000, or 15,000~17,000, for example. Measurement of such molecular weight may be made by the gel permeation chromatography and other standard measuring methods which do not involve solution formation of polymers, for example, by determining the terminal groups by way of infrared spectroscopy on compression-molded film. Alternatively, the molecular weight of the polymer may be measured, by applying the light scattering method in its pentafluorophenol solution.

The aforementioned polyesters and polyester amides, when dissolved at 60° C. in pentafluorophenol at a concentration of 0.1% by weight, will give intrinsic viscosities (I.V.) of at least approx. 2.0 dl/g, e.g., approx. 2.0~10.0 dl/g.

Polyesters which form anisotropic fused phase especially preferred for use with the method of this invention should contain approx. 10 mol % or more of repetitive units containing a naphthalene part such as 6-hydroxy-2-naphthoyl, 2,6-dioxynaphthalene and 2,6-dicarboxynaphthalene, etc. The preferable polyester amides contain repetitive units having the aforementioned naphthalene part and a part consisting of 4-aminophenol or 1,4-phenylenediamine. Particular examples are given hereunder:

(1) Polyesters substantially comprising the following repetitive units I and II:

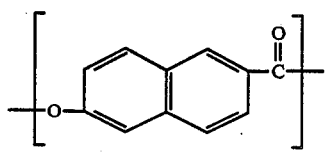

I

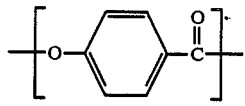

II

These polyesters contain approx. 10~90 mol % of unit I and approx. 10~90 mol % of unit II. Under a mode, the unit I exists up to the amount of approx. 65~85 mol %, preferably approx. 70~80 mol % (e.g., approx. 75 mol %). Under another mode, the unit II exists in such far small amounts in concentration as approx. 20-30 mol %. And at least part of the hydrogen atoms bonded to the rings may be substituted, as the case may be, by substituents selected from the group consisting of alkyl groups having 1~4 carbon atoms, alkoxyls having 1~4 carbon atoms, halogens, phenyl, substituted phenyls and their combinations.

(2) Polyesters substantially comprising the following repetitive units I, II and III:

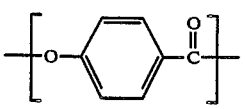

I

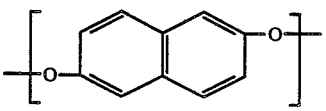

II

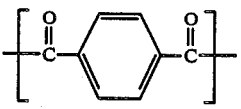

III

These polyesters contain approx. 30~70 mol % of unit I. They should preferably contain approx. 40~60 mol % of unit I, approx. 20~30 mol % of unit II and approx. 20~30 mol % of unit III. Further, at least part of the hydrogen atoms bonded to the rings may, as the case may be, be substituted by any substituents selected from the group consisting of alkyl groups having 1~4 carbon atoms, alkoxy groups having 1~4 carbon atoms, halogens, phenyl, substituted phenyls and their combinations.

(3) Polyesters substantially comprising the following repetitive units I, II, III and IV:

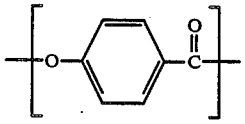

I

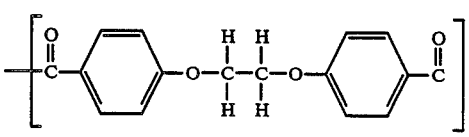

II

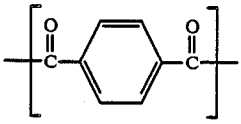

III

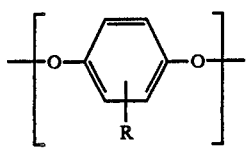

(where R represents methyl-, chloro-, bromo-group or their combinations, which are substituents for the hydrogen atoms on the benzene ring.)

They contain approx. 20~60 mol % of unit I, approx. 5~18 mol % of unit II, approx. 5~35 mol % of unit III and approx. 20~40 mol % of unit IV. These polyesters should preferably contain approx. 35~45 mol % of unit I, approx. 10~15 mol % of unit II, approx. 15~25 mol % of unit III and approx. 25~35 mol % of unit IV. Provided that the sum total molar concentration of units II and III is substantially equivalent to the mol concentration of unit IV. Besides, at least part of the hydrogen atoms bonded to the ring may, as the case may be, be substituted by any substituents selected from the group consisting of alkyl groups having 1~4 carbon atoms, halogens, phenyl, substituted phenyls and their combinations. These perfect aromatic polyesters, when dissolved at 60° C. in pentafluorophenol at a concentration of 0.3 w/v % will generally give their intrinsic viscosities at least 2.0 dl/g, e.g., 2.0~10.0 dl/g.

(4) Polyesters substantially comprising the following repetitive units I, II, III and IV:

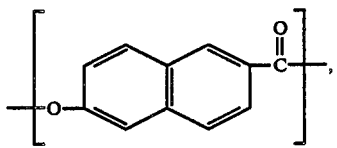

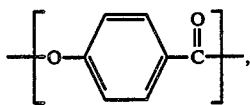

III Dioxyaryl unit represented by a general formula of [O—Ar—O] (where Ar represents divalent groups having at least one benzene ring).

IV Dicarboxyaryl units represented by a general formula

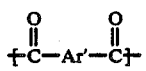

(where Ar' signifies divalent groups having at least one benzene ring).

These polyesters contain approx. 20~40 mol % of unit I, more than 10 mol % but less than approx. 50 mol % of unit II, more than 5 mol % but less than approx. 30 mol % of unit III and more than 5 mol % but less than 30 mol % of unit IV. They should preferably contain approx. 20~30 mol % (e.g., approx. 25 mol %) of unit I, approx. 25~40 mol % (e.g., approx. 35 mol %) of unit II, approx. 15~25 mol % (e.g., approx. 20 mol %) of unit III and approx. 15~25 mol % (e.g., approx. 20 mol %) of unit IV. Besides, at least part of the hydrogen atoms bonded to the ring may, as the case may be, be substituted by substituents selected from the group consisting of alkyl groups having 1~4 carbon atoms, alk-oxyl groups having 1~4 carbon atoms, halogens, phenyl, substituted phenyls and their combinations.

In units III and IV, the divalent bonds which connect one unit to other units on both sides thereof within the main chain of the polymer are in symmetrical arrangement on one or more benzene rings (for example, they are arranged at mutually para positions or at diagonal positions on the rings, when they exist on a naphthalene ring). However, such symmetrical units as may be derived from resorcinol and isophthalic acid are also usable.

Preferable dioxyaryl unit III is:

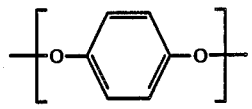

and desirable dicarboxyaryl unit IV is:

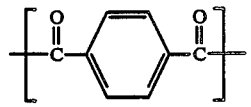

(5) Polyesters substantially comprising the following repetitive units I, II and III:

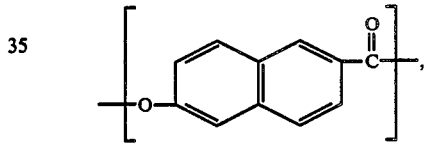

II Dioxyaryl unit represented by a general formula [O—Ar—O] (where Ar signifies a divalent group having at least one benzene ring).

III Dicarboxyaryl unit represented by a general formula

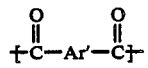

(where Ar' signifies a divalent group having at least one benzene ring).

These polyesters contain approx. 10~90 mol % of unit I, 5~45% of unit II, and 5~45 mol % of unit III. They should preferably contain approx. 10~40 mol % of unit I, approx. 10~40 mol % of unit II and approx. 10~40 mol % of unit III. Further preferably, such polyesters should contain approx. 60~80 mol % of unit I, approx. 10~20 mol % of unit II and approx. 10~20 mol % of unit III. Besides, at least part of hydrogen atoms bonded to the ring(s) may be substituted, as appropriate, by substituents selected from among a group consisting of alkyl groups having 1~4 carbon atoms, alkoxyl groups having 1~4 carbon atoms, halogens, phenyl, substituted phenyls and their combinations.

Preferable dioxyaryl unit II is:

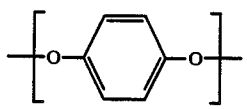

and desirable dicarboxyaryl unit III is:

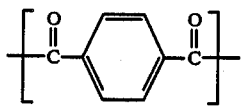

(6) Polyester amides substantially comprising following repetitive units I, II, III and IV:

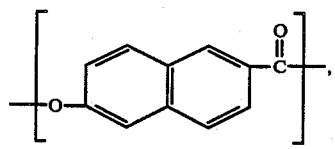

II General formula

(where A signifies a divalent group having at least one benzene ring or divalent trans-cyclohexane group).

III General formula [Y—Ar—Z] (where Ar indicates a divalent group having at least 1 benzene ring, Y is O, NH or NR, and Z stands for NH or NR, respectively; and R designates an alkyl group having 1~6 carbon atoms or aryyl group).

IV General formula [O—Ar'—O] (where Ar' denotes a divalent group having at least 1 benzene ring).

These polyesters contain approx. 10~90 mol % of unit I, approx. 5~45 mol % of unit II, approx. 5~45 mol % of unit III, and approx. 0~40 mol % of unit IV. Besides, at least part of the hydrogen atoms bonded to the rings may be substituted by substituents selected from among a group consisting of alkyl groups having 1~4 carbon atoms, alkoxyl groups, halogens, phenyl, substituted phenyls and their combinations.

A preferred dicarboxyaryl II unit is:

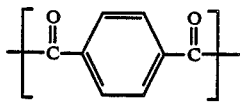

and a preferred unit III should be:

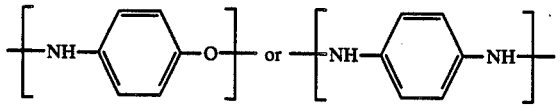

and further, desirable dioxyaryl unit IV should be:

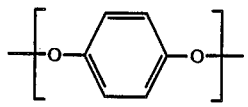

Furthermore, polymers forming the anisotropic melt phase of this invention may include polymers in which part of one high molecular chain is composed of polymer segments forming the anisotropic melt phase, while the remaining part is composed of segments of thermoplastic resins which do not form the anisotropic melt phase.

Mentioned as the fibers used according to this invention are the followings:

Metal fibers used include fibers of mild steel, stainless steel, copper and its alloys, bronze, aluminum and its alloys, lead, etc., while carbon fibers used are PAN base fibers made from polyacrylonitrile as the material and pitch base fibers.

Available as usable glass fibers are, besides normal glass fiber, glass fibers coated with such metals as nickel, copper, etc., silane fiber, aluminosilicate glass fiber, hollow glass fiber, non-hollow fiber, etc.; inorganic fibers include various fibers such as of rockwool, zirconia, alumina silica, potassium titanate, barium titanate, silicon carbide, alumina, silica, blast furnace slag, etc.; and whiskers used are silicon nitride whisker, silicon oxide nitride whisker, basic magnesium sulfate whisker, barium titanate whisker, silicon carbide whisker, boron whisker, etc.

Available as synthetic fibers are Aramid which is a fully aromatic polyamide and Kynol which is a phenolic resin fiber, etc.

Ore fibers used include asbestos, wollastonite, etc., while natural fibers available are cellulose fibers, flax yarns, etc.

Preferred fibers are carbon fibers, glass fibers, inorganic fibers and synthetic fibers, particularly favorable being PAN and pitch base carbon fibers and in addition, potassium titanate, etc.

The fibers abovementioned may be used singly or in combination of more than two types and the surface treatment of fibers normally used for their mixing with thermoplastic resins will provide an improved result. For the surface treatment, such approaches may be taken as use of coupling agents of silanes, titanates, etc., coating with low and high molecular weight organic compounds and oxidation treatment, etc.

These fibers are utilized in amounts from 2 to 70% by weight of the total weight including the weight of the resin, values of 10 to 50 percent by weight being preferred.

Their shape should preferably be fibrous, with their length desirably less than 12 mm for facility in kneading.

As desired, the lubricants will include solid lubricant like molybdenum disulfide, graphite, etc., which are available as plate crystal, polymer lubricants including fluoropolymers such as polytetrafluoroethylene, tetrafluoroethylene-hexafluoropropylene copolymer, polytrichlorofluoroethylene, tetrafluoroethylene-perfluoroalkyl vinyl ether copolymer, etc., mineral oils, siliciones, etc., and oil lubricants which are low molecular organic compounds, of which particularly preferred are molybdenum disulfide, graphite and polytetrafluoroethylene.

These lubricants are used in 1~50% by weight of the total weight of the product including the weight of the resin, from 2 to 30% by weight being preferable.

The antistatic agent which is used as desired is effective for protection against fine injury on gears from dust deposited from air. This end may be served either by applying it on the surface or by incorporating into the resin composition, the latter being preferred, taking account of workability.

The antistatic agents may be classified into cationic, anionic, nonionic and amphoteric types.

Mentioned as antistatic agents of anionic type are:
Phosphoric acid ester type:

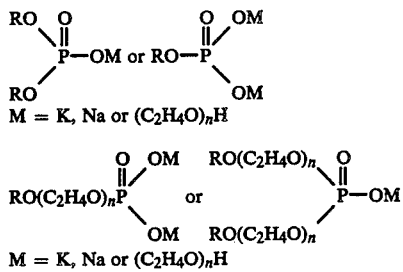

Sulfuric acid type:

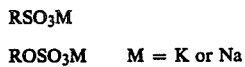

ROSO$_3$M     M = K or Na

Sulfuric acid ester type:

etc.

Mentioned as cationic type are:
Quaternary ammonium salts:

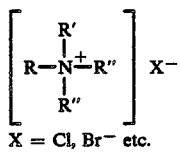

X = Cl$^-$, Br$^-$ etc.

Imidazoline type:

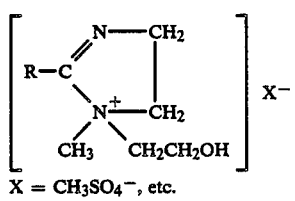

X = CH$_3$SO$_4^-$, etc.

Amidoamine type:

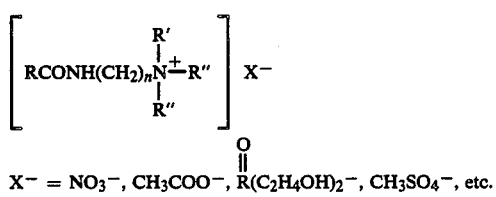

X$^-$ = NO$_3^-$, CH$_3$COO$^-$, R(C$_2$H$_4$OH)$_2^-$, CH$_3$SO$_4^-$, etc.

Mentioned as nonionic type are:
Alkyl-ether, -ester type:

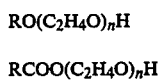

Polyoxyethylene sorbitan ester type:

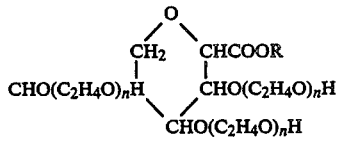

Alkyl-amine type:

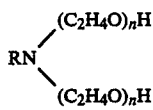

Alkyl-amide type:

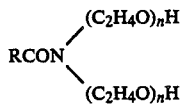

Mentioned as amphoteric type are:
Betain type:

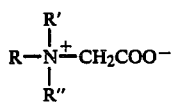

Alanine type:

RNHCH$_2$COONa

These antistatic agents are used in the similar manner as ordinary thermoplastic resins, but in view of thermal stability, etc., the anionic, nonionic and amphoteric are desirable, of which the nonionic is especially preferred.

The antistatic agent is used in 0.1 to 5% by weight of the total weight of the gear including the weight of the resin.

Ordinary methods for prevention of troubles resulting from static, besides the use of antistatic agents, may be used. They include application of conductive coating and mixing-in of conductive fillers, the latter being preferable. Usable as the conductive fillers are such metal powders as powder of iron, bronze, copper, aluminum, nickel, etc., and their flakes; carbon powder like powder of carbon black, acetylene black, etc., and carbon microballons; glass flakes coated with such metals as nickel, silver, copper, etc., and such metal oxides as oxides of iron, tin, etc., of which carbon powder is especially desirable.

These conductive fillers are used in 0.5 to 50% by weight of the total weight of the product including the weight of the resin, etc., or preferably 2 to 30% by weight.

The polymer compositions used according to this invention which form the anisotropic melt phase may contain one or more of 1 polymers which form other anisotropic melt phase, ② thermoplastic resins which do not form the anisotropic melt phase, ③ thermosetting resins, ④ low molecular organic compounds and ⑤ inorganic matters. In these compositions, the polymers which form the anisotropic melt phase and the remaining part are allowed to be either thermodynamically compatible or not.

The aforementioned ② thermoplastic resins include: e.g., polyethylene, polypropylene, polybutylene, polybutadiene, polyisoprene, polyvinyl acetate, polyvinyl chloride, polyvinylidene chloride, polystyrene, acrylic resins, ABS resin, AS resin, BS resin, polyurethane, silicone resins, polyacetal, polycarbonate, polyethylene terephthalate, polybutylene terephthalate, aromatic polyester, polyamide, polyacrylonitrile, polyvinyl alcohol, polyvinyl ether, polyether imide, polyamide imide, polyether ether imide, polyether ether ketone, polyether sulfone, polysulfone, polyphenylene sulfide, polyphenylene oxide, etc.

And the aforementioned ③ thermosetting resins include: e.g., phenol resins, epoxy resins, melamine resins, urea resins, unsaturated polyester resins, alkyd resins, etc.

Then the aforementioned ④ low molecular weight organic compounds include: e.g., materials which are added to common thermoplastic resins and thermosetting resins, that is, low molecular weight organic compounds for use as plasticizer, stabilizers such as antioxidants and ultraviolet ray absorbers, etc., flame retardants, coloring agents like dyes, pigments, etc., foaming agents, further, bridging agents like divinyl base compounds, peroxides, vulcanizers, etc., and lubricants for improvement in fluidity and mold releasing property.

Further the aforementioned ⑤ inorganic compounds include materials which are added to common thermoplastic resins and thermosetting resins, such as kaolin, baked clay, talc, Canada mica, mica, vermiculite, calcium silicate, feldspar powder, acid clay, pagodite clay, sericite, sillimanite, bentonite, glass flake, glass powder, glass beads, slate powder, silicates like silane, etc., carbonates like calcium carbonates, white lead, barium carbonate, magnesium carbonate, dolomite, etc.; sulfates like baryta powder, blanc fixe, precipitated calcium sulfate, calcined plaster, etc.; hydroxides like hydrated alumina, etc.; oxides like alumina, antimony oxide, magnesia, titanium oxide, zinc white, amorphous silica, flint quartz, silica sand, white carbon, diatomaceous earth, etc.

Besides organic compounds, woody powders like wood flour, coconut flour, nut flour, pulp powder, etc., may be added.

It should be appreciated that for the method of molding gears by using the compositions of this invention, the molding methods for use with ordinary thermoplastic resins are usable; thus, it is possible to form the product by means of extrusion molding, press-forming, stamping, cutting, etc., besides injection molding.

With the resin compositions of this invention, the characteristics of the gears obtained are very much influenced by the position of the gate at the time of molding. Thus when molding a gear using a resin which shows anisotropy while being molten, a product having high strength at the root of the teeth and small coefficient of linear expansion is obtained, if the gate is positioned at the axial center. This is a notable characteristic peculiar only to resins which show anisotropy while being molten; since this property enables these resin compositions to achieve the outstanding improvement in the characteristics of gears. The word axial center implies that the gate should be located as near to the axial center as its design permits at the time of setting up the mold. Thus it may be placed in the neighborhood, if, in fact, the gate can not be positioned at the axial center.

[Effect of the Invention]

As hereabove described, the resin compositions of this invention are most suitable as compounds for gears having high mechanical strengths, high resistance to heat and thermal deformation and showing very small shrinkage when being molded, and the molded gears permit miniaturization and expansion of their usable temperature range. And the gears obtained with these resin compounds for gears have high teeth root strength to provide high load bearing capacity and give very small molding shrinkage, so that only small errors are involved with these gears in single pitch, neighboring pitch, accumulating pitch, normal pitch, etc., and therefore, their use is effective not merely as ordinary spur gears or cylindrical gears but as such gears as helical gears, double helical gears, straight bevel gears, spiral bevel gears, zerol bevel gears, crossed helical gears, hypoid gears, worm gears and multithread worm gears, etc., in which their intermeshing pitch circle is not on the same plane as the direction in which the force is transmitted or their pitch helix is not parallel to the axial direction of the cylinder.

These gears are usable in such various fields as electronic, electric parts, automobile parts and sundries, etc. Especially, they are suitable for uses in electronic and electric fields such as electronic copying machines, etc., which are subjected to strict environmental using conditions, or in automobile field like wiper gears.

BRIEF DESCRIPTION OF THE DRAWINGS

FIG. 1 is an elevation view of a respresentative improved gear in accordance with the present invention showing the position of the mold gate g located at the axial center of the gear.

FIG. 2 is a cross-sectional view of the improved gear in accordance with the present invention taken along the line 2—2 of FIG. 1.

FIG. 3 is an elevation view for comparative purposes of a gear not in accordance with the present invention showing the positions, a, b, c and d of the mold gate at locations other than the axial center.

[PREFERRED EMBODIMENTS]

The present invention will become more apparent from the following description taken in connection with its preferred embodiments:

EXAMPLE 1

After extrusion and kneading of 80 parts of resin A and 20 parts of PAN base carbon fiber, a test piece was formed, using Nissei injection molder FS-75N II. The molding conditions were such that the temperature of the cylinder part was held at 290° C., the nozzle at 300° C., and the mold 80° C., and the injection pressure was set at 300 kg/cm$^2$, with the test piece being in the shape of a spur gear having a pitch circle diameter of 60 mm and a module of 1.0 mm. The test piece thus molded was left standing for 24 hours in a thermostatic chamber held at 23° C. with 50% humidity and measurements were taken respectively of teeth root strength, coefficient of linear expansion, specific wear rate and thermal deformation temperature. The teeth root strength was measured on a torsion tester manufactured by Shimazu by applying torque on the spur gear side, with the worm of the worm gear fixed. The coefficient of linear expansion was calculated from the readings taken of the teeth tip diameter as the temperature was varied between 80° C. and 150° C. The specific wear was measured, using the Suzuki's wear tester. The measurement of the thermal deformation temperature was taken as usual (18.6 kgf/cm$^2$) with a test piece prepared under the similar conditions.

Subsequently, various measurements of Examples from 2 to 12 and Comparative Examples from 1 through 13 were similarly made with test pieces respectively prepared.

The polymers A, B, C and D which form the anisotropic fused phase have the following structural units:

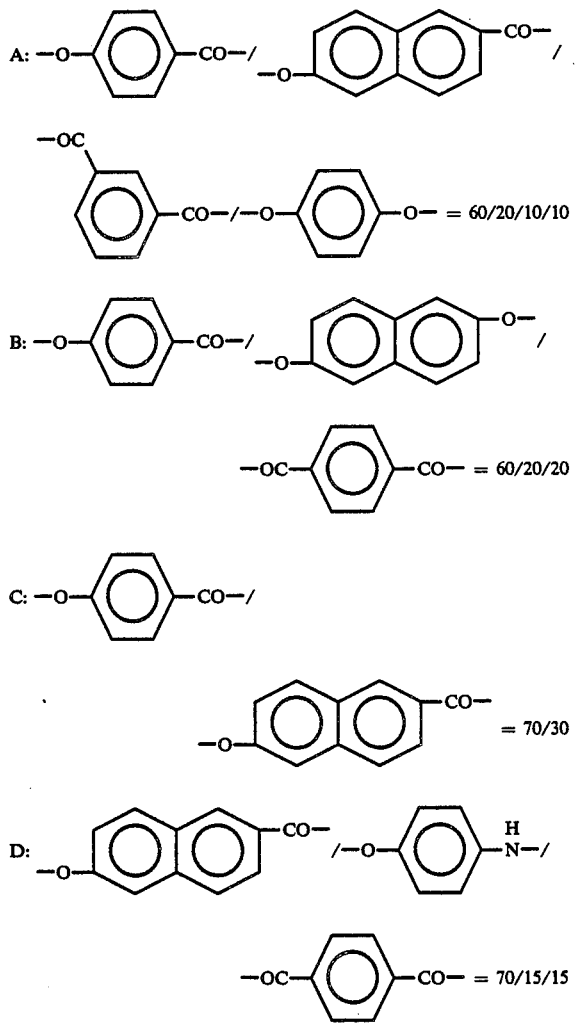

Definite manufacturing methods of the aforementioned resins A, B, C and D are described hereunder:

<Resin A>

1081 parts by weight of 4-acetoxybenzoic acid, 460 parts by weight of 6-acetoxy-2-naphthoic acid, 166 parts by weight of isophthalic acid and 194 parts by weight of 1,4-diacetoxybenzene were charged in a reaction vessel equipped with a stirrer, nitrogen inlet tube and a discharge tube and this mixture was heated to 260° C. in a nitrogen current. The content of the reaction vessel was, then, vigorously stirred for a time period of 2.5 hours at 260° C. and, then, 3 hours at 280° C., while letting acetic acid flow out of the reaction vessel. Then the temperature was further raised to 320° C. and after stopping the introduction of nitrogen, the pressure inside the reaction vessel was reduced, the pressure being dropped to 0.1 mmHg 15 minutes later, and its content was stirred at this temperature and pressure for 1 hour.

The polymer thus obtained was found to be at a concentration of 0.1% by weight and have an intrinsic viscosity of 5.0, as measured in pentafluorophenol at 60° C.

<Resin B>

1081 parts by weight of 4-acetoxybenzoic acid, 489 parts by weight of 2,6-diacetoxynaphthalene and 332 parts by weight of terepthalic acid were charged in a reaction vessel equipped with a stirrer, nitrogen inlet tube and discharge tube and this mixture was heated to 250° C. in a nitrogen current. It was vigorously stirred for 2 hours at 250° C. and, then, for 2.5 hours at 280° C., while letting acetic acid flow out of the reaction chamber. Then the temperature was further raised to 320° C. and after stopping the introduction of nitrogen, the pressure inside the reaction vessel was gradually reduced, the pressure being dropped to 0.2 mmHg 30 minutes later and its content was stirred for 1.5 hours at this temperature and pressure.

The polymer thus obtained was found to be at a concentration of 0.1% by weight and had an intrinsic viscosity of 2.5, as measured in pentafluorophenol at 60° C.

<Resin C>

1261 parts by weight of 4-acetoxybenzoic acid and 691 parts by weight of 6-acetoxy-2-naphthoic acid were charged into a reaction vessel equipped with a stirrer, nitrogen inlet tube and discharge tube and this mixture was heated to 250° C. under a nitrogen current. It was vigorously stirred for 3 hours at 250° C. and, then, for 2 hours at 280° C., while letting acetic acid flow out of the reaction vessel. Then its temperature was raised to 320° C. and after stopping the introduction of nitrogen, the pressure inside the reaction vessel was gradually reduced, thus the pressure being dropped to 0.1 mmHg 20 minutes later. It was, then, stirred for 1 hour at this temperature and pressure.

The polymer thus obtained was found to be at a concentration of 0.1% by weight and have an intrinsic viscosity of 5.4, as measured in pentafluorophenol.

<Resin D>

1612 parts by weight of 6-acetoxy-2-naphthoic acid, 290 parts by weight of 4-acetoxyacetanilide, 249 parts by weight of terephthalic acid and 0.4 parts by weight of sodium acetate were charged into a reaction vessel equipped with a stirrer, nitrogen inlet tube and discharge tube and this mixture was heated to 250° C. in a nitrogen current. Its content was vigorously stirred for 1 hour at 250° C. and, then, for 3 hours at 300° C. Then its temperature was further raised to 340° C. and after stopping the introduction of nitrogen, the pressure inside the reaction vessel was reduced, thus the temperature being dropped to 0.2 mmHg 30 minutes later. It was, then, stirred for 30 minutes at this temperature and pressure.

The polymer thus obtained was found to be at a concentration of 0.1% by weight and have an intrinsic viscosity of 3.9, as measured in pentafluorophenol.

It should be noted that the fibers, lubricants and antistatic agents, etc. used are as follows: Carbon fibers;

PAN base: made by Toho Besuron K. K., C6-N

-continued

| | |
|---|---|
| Pitch base: | made by Kureha Kagaku K. K., C-106S |
| Glass fiber; | made by Asahi Fiber Glass K. K., 847 |
| Tismo; | made by Otsuka Kagaku Yakuhin K. K., Potassium titanate |
| Molybdenum disulfide; | made by Nihon Moribuden K. K., Powder |
| Wollastonite; | made by Interpace Corp. |
| Graphite; | made by Superior Graphito Co. |
| PTFE; | made by Daikin Kogyo K. K., Fluon L169 |
| Antistatic agent; | made by Kao Sekken K. K., Electrostripper EA |
| POM; | made by Polyplastics, Duracon M90 |
| PBT; | made by Polyplastics, Duraneck 2000 |
| Nylon; | made by Polyplastics, 66 Nylon |

In Comparative Example 7, the product was bone-dried by annealing at 190° C. for 1 hour and after being immersed in hot water at 95° C. for 5 hours, showed a water absorbing capacity of 1.3% by weight. This was used as the test piece.

The results of Tables 1 through 4 clearly indicate that the gear compositions of this invention are significantly superior to other compositions in teeth root strength, coefficient of linear expansion, specific wear as well as in thermal deformation temperature.

Table 5 shows the effect on the composition of the use of antistatic agent. The test piece was continuously moved by a work gear for 8 hours in a room having only small dust which was controlled to constant temperature and humidity and, then, after leaving it for 2 hours, its teeth root strength was measured in the similar manner.

Tables 6 and 7 indicate the effect of gate position. In these tables also, the center gate identifies the gate being positioned at the center g, as shown in FIG. 1, and 4 point gates signify gates being positioned at the four points a, b, c and d of FIG. 3.

TABLE 1

Reinforcing Effects of Fibers

| Example No. | Resin | Fiber | Teeth root strength kg · cm | Coefficient of linear expansion cm/cm/°C. | Specific wear mm³/kg · km | Thermal deformation temperature °C. |
|---|---|---|---|---|---|---|
| Example 1 | A(80) | CF(20) | 680 | $2.2 \times 10^{-5}$ | $0.9 \times 10^{-2}$ | 220 |
| Comp. Example 1 | A(100) | | 410 | $2.7 \times 10^{-5}$ | $62.4 \times 10^{-2}$ | 175 |
| Example 1 | C(80) | CF(20) | 714 | $1.8 \times 10^{-5}$ | $0.3 \times 10^{-2}$ | 230 |
| Comp. Example 2 | C(100) | | 423 | $2.5 \times 10^{-5}$ | $50.5 \times 10^{-2}$ | 180 |

Notes:
The numeral in ( ) designates parts by weight.
GF: Glass fiber
CF: Carbon fiber (PAN base)
CpF: Carbon fiber (pitch base)
The same designations apply in the following tables.

TABLE 2

Comparisons with Other Resins

| Example No. | Resin | Fiber | State | Teeth root strength kg · cm | Coefficient of linear expansion cm/cm/°C. | Specific wear mm³/kg · km | Thermal deformation temperature °C. |
|---|---|---|---|---|---|---|---|
| Example 1 | A(80) | CF(20) | | 680 | $2.2 \times 10^{-5}$ | $0.9 \times 10^{-2}$ | 220 |
| Example 2 | B(80) | " | | 705 | $2.1 \times 10^{-5}$ | $0.5 \times 10^{-2}$ | 230 |
| Example 3 | C(80) | " | | 714 | $1.8 \times 10^{-5}$ | $0.3 \times 10^{-2}$ | 230 |
| Example 4 | D(80) | " | | 729 | $0.7 \times 10^{-5}$ | $0.3 \times 10^{-2}$ | 235 |
| Comp. Example 5 | POM(80) | " | | 456 | $8.5 \times 10^{-5}$ | $3.6 \times 10^{-2}$ | 160 |
| Comp. Example 6 | PBT(80) | " | | 374 | $7.2 \times 10^{-5}$ | $15.2 \times 10^{-2}$ | 210 |
| Comp. Example 7 | Nylon(80) | " | Bone dried state | 533 | $4.8 \times 10^{-5}$ | $4.1 \times 10^{-2}$ | 220 |
| Comp. Example 8 | Nylon(80) | " | Wet state | 285 | $17 \times 10^{-5}$ | $8.9 \times 10^{-2}$ | 190 |

TABLE 3

Comparisons in Terms of Fiber and Resin

| Example No. | Resin | Fiber | Teeth root strength kg · cm | Coefficient of linear expansion cm/cm/°C. | Specific wear mm³/kg · km | Thermal deformation temperature °C. |
|---|---|---|---|---|---|---|
| Example 2 | C(80) | CF(20) | 714 | $1.8 \times 10^{-5}$ | $0.3 \times 10^{-2}$ | 230 |
| Example 5 | C(80) | CpF(20) | 672 | $1.9 \times 10^{-5}$ | $0.4 \times 10^{-2}$ | 230 |
| Comp. Example 9 | POM(80) | CpF(20) | 424 | $8.9 \times 10^{-5}$ | $3.8 \times 10^{-2}$ | 160 |
| Example 6 | C(80) | GF(20) | 682 | $1.9 \times 10^{-5}$ | $62.5 \times 10^{-2}$ | 230 |
| Comp. Example 10 | POM(80) | GF(20) | 433 | $9.2 \times 10^{-5}$ | $79.1 \times 10^{-2}$ | 160 |
| Example 7 | C(80) | Tismo(20) | 529 | $2.1 \times 10^{-5}$ | $10.0 \times 10^{-2}$ | 210 |
| Comp. Example 11 | POM(80) | Tismo(20) | 411 | $9.4 \times 10^{-5}$ | $12.5 \times 10^{-2}$ | 160 |

TABLE 3-continued

Comparisons in Terms of Fiber and Resin

| Example No. | Resin | Fiber | Teeth root strength kg·cm | Coefficient of linear expansion cm/cm/°C | Specific wear mm³/kg·km | Thermal deformation temperature °C |
|---|---|---|---|---|---|---|
| Example 8 | C(80) | Wollastonite(20) | 452 | $2.5 \times 10^{-5}$ | $10.2 \times 10^{-2}$ | 190 |
| Comp. Example 12 | POM(80) | Wollastonite(20) | 324 | $9.4 \times 10^{-5}$ | $12.5 \times 10^{-2}$ | 115 |

TABLE 4

Comparisons in Terms of Lubricant

| Example No. | Resin | Fiber | Lubricant | Teeth root strength kg·cm | Coefficient of linear expansion cm/cm/°C | Specific wear mm³/kg·km |
|---|---|---|---|---|---|---|
| Example 5 | C(80) | CpF(20) |  | 672 | $1.9 \times 10^{-5}$ | $0.4 \times 10^{-2}$ |
| Example 9 | C(80) | " | Graphite(5) | 670 | $2.0 \times 10^{-5}$ | $0.2 \times 10^{-2}$ |
| Comp. Example 13 | POM(80) | " | " | 421 | $9.0 \times 10^{-5}$ | $10 \times 10^{-2}$ |
| Example 10 | C(80) | " | MoS₂(5) | 671 | $2.0 \times 10^{-5}$ | $0.3 \times 10^{-2}$ |
| Example 11 | C(80) | " | PTFE(5) | 670 | $2.1 \times 10^{-5}$ | $0.1 \times 10^{-2}$ |

TABLE 5

Effect of Antistatic Agent

| Example No. | Resin | Fiber | Antistatic agent | Teeth root strength kg·cm Initial value | Teeth root strength kg·cm After 8 hr operation |
|---|---|---|---|---|---|
| Example 2 | C(80) | CF(20) | none | 714 | 699 |
| " | C(80) | " | added (0.4) | 714 | 710 |

TABLE 6

Gate Position at the Time of Molding

| Example No. | Resin | Fiber | Gate position | Teeth root strength kg·cm | Coefficient of linear expansion cm/cm/°C |
|---|---|---|---|---|---|
| Example 2 | C(80) | CF(20) | Center gate | 714 | $1.8 \times 10^{-5}$ |
| Comp. Example 14 | C(80) | " | 4 Point gates | 549 | $3.7 \times 10^{-5}$ |
| Comp. Example 15 | C(80) | " | 1 Point gate Only one at a | 487 | $4.9 \times 10^{-5}$ |
| Comp. Example 16 | C(80) | " | 2 Point gates Two points at a and c | 525 | $4.2 \times 10^{-5}$ |
| Comp. Example 17 | POM(80) | " | 4 Point gates | 452 | $8.5 \times 10^{-5}$ |
| Example 5 | POM(80) | " | Center gate | 456 | $8.5 \times 10^{-5}$ |
| Comp. Example 18 | PBT(80) | " | 4 Point gates | 373 | $7.2 \times 10^{-5}$ |
| Comp. Example 6 | PBT(80) | " | Center gate | 374 | $7.2 \times 10^{-5}$ |

TABLE 7

Effect of the Type of Resin used in Gate Position

| Example No. | Resin | Gate position | Teeth root strength kg·cm | Coefficient of linear expansion cm/cm/°C |
|---|---|---|---|---|
| Example 13 | A(100) | Center gate | 410 | $2.3 \times 10^{-5}$ |
| Comp. Example 19 | A(100) | 4 Point gates | 302 | $3.9 \times 10^{-5}$ |
| Example 14 | B(100) | Center gate | 418 | $2.0 \times 10^{-5}$ |
| Comp. Example 20 | B(100) | 4 Point gates | 307 | $3.9 \times 10^{-5}$ |
| Example 15 | C(100) | Center gate | 423 | $0.9 \times 10^{-5}$ |
| Comp. Example 21 | C(100) | 4 Point gates | 300 | $4.1 \times 10^{-5}$ |
| Example 16 | D(100) | Center gate | 457 | $0.6 \times 10^{-5}$ |
| Comp. | D(100) | 4 Point gates | 319 | $4.4 \times 10^{-5}$ |
| Example 22 Comp. Example 23 | POM(100) | Center gate | 276 | $10 \times 10^{-5}$ |
| Comp. | POM(100) | 4 Point gates | 276 | $10 \times 10^{-5}$ |
| Example 24 Comp. | PBT(100) | Center gate | 243 | $10 \times 10^{-5}$ |
| Example 25 Comp. Example 26 | PBT(100) | 4 Point gates | 242 | $10 \times 10^{-5}$ |

The embodiments of the invention in which an exclusive property or privilege is claimed are defined as follows:

1. An improved gear formed by the injection molding of a composition comprising 30 to 98 percent by weight of a melt-processable polymer which is capable of forming an anisotropic melt phase and 2 to 70 percent by weight of reinforcing fibers, wherein the mold gate at the time of gear formation was located at approximately the axial center of the gear.

2. An improved gear according to claim 1 wherein said molding composition comprises 50 to 90 percent by weight of said melt-processable polymer which is capable of forming an anisotropic melt phase and 10 to 50 percent by weight of reinforcing fibers.

3. An improved gear according to claim 1 wherein the melt-processable polymer which is capable of forming an anisotropic melt phase contains more than approximately 10 mol percent of naphthalene units.

4. An improved gear according to claim 3 wherein said naphthalene units of said melt-processable polymer which is capable of forming an anisotropic melt phase are selected from the group consisting of 6-hydroxy-2-naphthoyl, 2,6-dioxynaphthalene, and 2,6-dicarboxynaphthalene.

5. An improved gear according to claim 1 wherein said melt-processable polymer which is capable of forming an anisotropic melt phase exhibits an intrinsic viscosity of at least 2.0 dl./g. when dissolved in a concentration of 0.1 percent by weight in pentafluorphenol at 60° C.

6. An improved gear according to claim 1 wherein said melt-processable polymer which is capable of forming an anisotropic melt phase is a polyester which consists essentially of the recurring moieties I and II which may include substitution of at least some of the hydrogen atoms present upon an aromatic ring wherein:

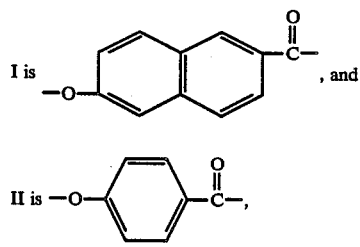, and

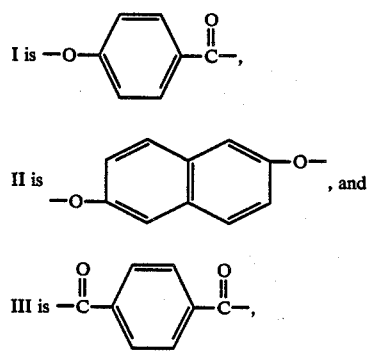

with said optional substitution if present being selected from the group consisting of an alkyl group of 1 to 4 carbon atoms, an alkoxyl group of 1 to 4 carbon atoms, halogen, phenyl, substituted phenyl, and mixtures of the foregoing, and wherein said polyester comprises approximately 10 to 90 mol percent of moiety I, and approximately 10 to 90 mol percent of moiety II.

7. An improved gear according to claim 1, wherein said melt processable polymer which is capable of forming an anisotropic melt phase is a polyester which consists essentially of recurring moieties I, II and III where:

with said optional substitution if present being selected from the group consisting of an alkyl group of 1 to 4 carbon atoms, an alkoxyl group of 1 to 4 carbon atoms, halogen, phenyl, substituted phenyl, and mixtures of the foregoing, and wherein said polyester comprises about 30 to 70 mol percent of moiety I.

8. An improved gear according to claim 7 wherein moiety I is present in a concentration of about 40 to 60 mol percent, moiety II is present in a concentration of about 20 to 30 mol percent, and moiety III is present in a concentration of about 20 to 30 mol percent.

9. An improved gear according to claim 1 wherein said melt-processable polymer which is capable of forming an anisotropic melt phase is a polyester which consists essentially of the recurring moieties I, II, III and IV wherein:

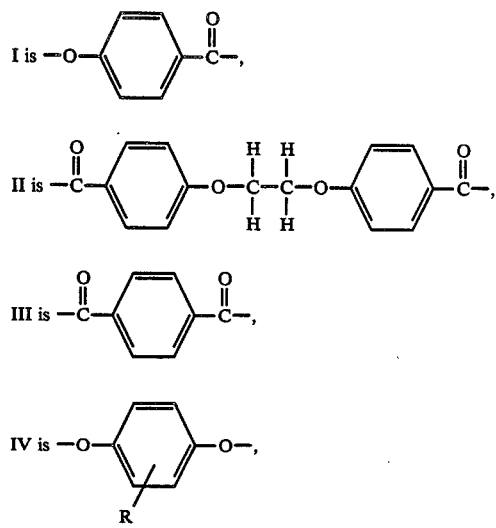

where R is methyl, chloro, bromo, and mixtures thereof, and is substituted for a hydrogen atom present upon the aromatic ring, and wherein the polyester comprises about 20 to 60 mol percent of moiety I, about 5 to 18 mol percent of moiety II, about 5 to 35 mol percent of moiety III, and about 20 to 40 mol percent of moiety IV.

10. An improved gear according to claim 9 wherein moiety I is present in a concentration of about 35 to 45 mol percent, moiety II is present in a concentration of about 10 to 15 mol percent, moiety III is present in a concentration of about 15 to 25 mol percent, and moiety IV is present in a concentration of about 25 to 35 mol percent.

11. An improved gear according to claim 1 wherein said melt-processable polymer which is capable of forming an anisotropic melt phase is a polyester which consists essentially of moieties I, II, III and IV which may include substitution of at least some of the hydrogen atoms present upon an aromatic ring wherein:

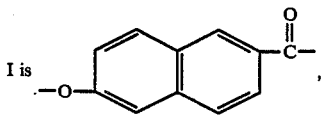

-continued

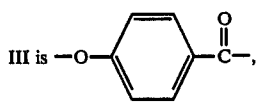

III is a dioxyaryl moiety of the formula —O—Ar—O— where Ar is a divalent radical comprising at least one benzene ring, and IV is a dicarboxyaryl moiety of the formula

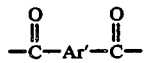

where Ar' is a divalent radical comprising at least one benzene ring,
with said optional substitution if present being selected from the group consisting of an alkyl group of 1 to 4 carbon atoms, an alkoxyl group of 1 to 4 carbon atoms, halogen, phenyl, substituted phenyl, and mixtures of the foregoing, and wherein said polyester comprises about 20 to 40 mol percent of moiety I, in excess of 10 mol percent but less than about 50 mol percent of moiety II, in excess of 5 mol percent but less than about 30 mol percent of moiety III, and in excess of 5 mol percent but less than 30 mol percent of moiety IV.

12. An improved gear according to claim 11 wherein moiety I is present in a concentration of about 20 to 30 mol percent, moiety II is present in a concentration of bout 25 to 40 mol percent, moiety III is present in a concentration of about 15 to 25 mol percent, and moiety IV is present in a concentration of about 15 to 25 mol percent.

13. An improved gear according to claim 1 wherein said melt-processable polymer which is capable of forming an anisotropic melt phase is a polyester which consists essentially of recurring moieties I, II, and III which may include substitution of at least some of the hydrogen atoms present upon an aromatic ring wherein:

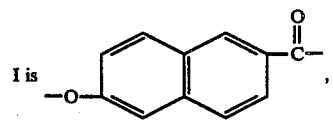

II is a dioxyaryl moiety of the formula —O—Ar—O— where Ar is a divalent radical comprising at least one benzene ring, and III is a dicarboxyaryl moiety of the formula

where Ar' is a divalent radical comprising at least one benzene ring,
with said optional substitution if present being selected from the group consisting of an alkyl group of 1 to 4 carbon atoms, an alkoxyl group of 1 to 4 carbon atoms, halogen, phenyl, substituted phenyl, and mixtures of the foregoing, and wherein said polyester comprises about 10 to 90 mol percent of moiety I, about 5 to 45 mol percent of moiety II, and about 5 to 45 mol percent of moiety III.

14. An improved gear according to claim 13 wherein moiety I is present in a concentration of about 60 to 80 mol percent, moiety II is present in a concentration of about 10 to 20 mol percent, and moiety III is present in a concentration of about 10 to 20 mol percent.

15. An improved gear according to claim 1 wherein said melt-processable polymer which is capable of forming an anisotropic melt phase is a poly(ester-amide) which consists essentially of recurring moieties I, II, and III, and optionally IV, wherein:

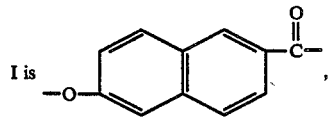

II is

where A is a divalent radical comprising at least one benzene ring or a divalent trans-cyclohexane radical, III is a —Y—Ar—Z— where Ar is a divalent radical comprising at least one benzene ring, Y is O, NH, or NR, and Z is NH or NR, where R is an alkyl group having 1 to 6 carbon atoms or an aryl group, and IV is —O—Ar'—O— where Ar' is a divalent radical comprising at least one benzene ring,
with said optional substitution if present being selected from the group consisting of an alkyl group of 1 to 4carbon atoms, and alkoxyl group of 1 to 4 carbon atoms, halogen, phenyl, substituted phenyl, and mixtures of the foregoing, and wherein said poly(ester-amide) comprises about 10 to 90 mol percent of moiety I, about 5 to 45 mol percent of moiety II, about 5 to 45 mol percent of moiety III, and about 0 to 40 mol percent of moiety IV.

16. An improved gear according to claim 15 wherein

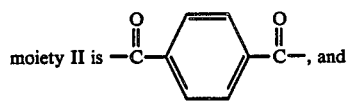

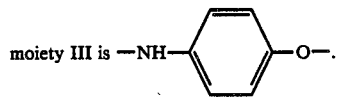

17. An improved gear according to claim 1 wherein said reinforcing fibers are selected from the group consisting of metallic fibers, carbon fibers, glass fibers, synthetic polymeric fibers, and combinations of two or more of the foregoing.

18. An improved gear according to claim 1 wherein said reinforcing fibers are carbon fibers.

19. An improved gear according to claim 1 wherein said reinforcing fibers are glass fibers.

* * * * *